Sept. 22, 1936.         D. L. GALLUP                    2,055,253
                        BRAKING SYSTEM
                      Filed July 26, 1934
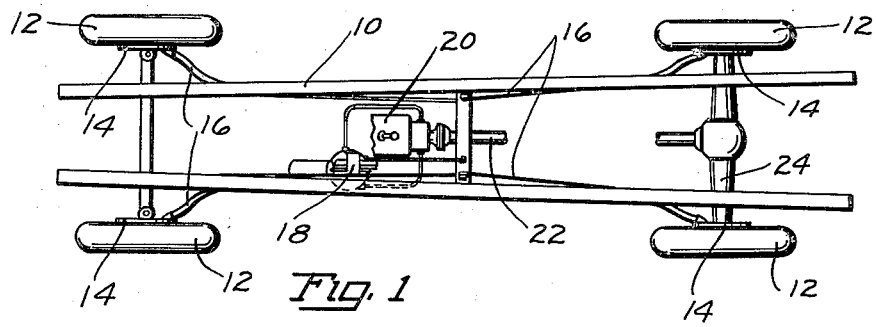
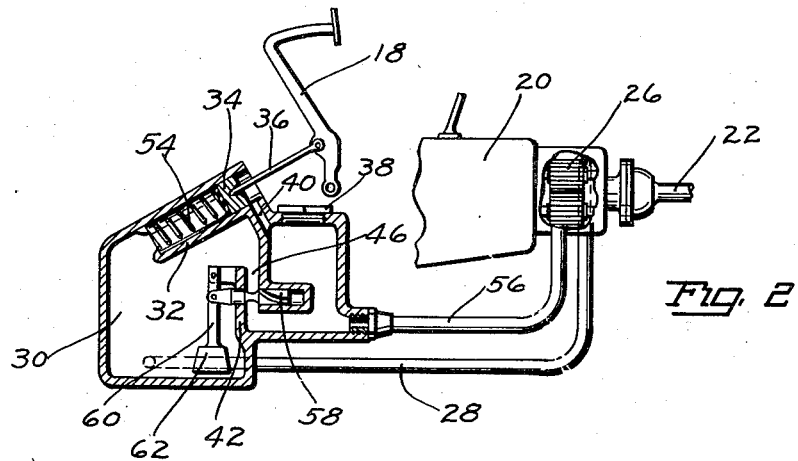
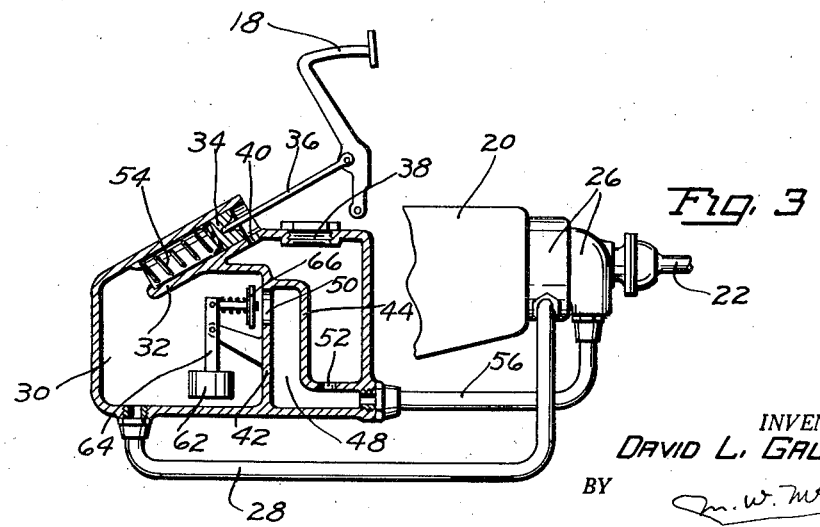
INVENTOR.
DAVID L. GALLUP
BY
ATTORNEY Patented Sept. 22, 1936

2,055,253

UNITED STATES PATENT OFFICE 2,055,253

BRAKING SYSTEM

David L. Gallup, South Bend, Ind., assignor to Bendix Products Corporation, South Bend, Ind., a corporation of Indiana Application July 26, 1934, Serial No. 736,997

12 Claims. (Cl. 188—2)

This invention relates to brakes, and is illustrated as embodied in an automobile having a system of four-wheel brakes.

One object of the invention is to cause a relatively high resisting force to act against the driver's foot whenever the braking force becomes excessive so as to prevent grabbing of the brakes.

A further object of the invention is to impose an automatically varied resistance to the operation of the brake pedal or other brake control member, so that increases in car speed result in corresponding increases in pedal pressures necessary for equivalent braking.

I prefer to control this resistance to the brake applying force by inertia means which causes the resistance to operate almost instantly whenever the brake is applied to exert an increase in the force acting against the driver's foot. In the illustrated arrangement, this means comprises an inertia valve controlling the circulation of pressure fluid to a cylinder or the like having a piston or an equivalent diaphragm connected to the brake pedal or its equivalent.

I consider it preferable to supply the pressure fluid from means such as a pump driven by the vehicle-driving mechanism, and shown as arranged in the transmission, so that the pedal pressure is a function of the vehicle speed. Thus at high speeds the driver must exert greater force than at low speeds to exert a given effective applying force on the brakes.

The above and other objects and features of the invention, including various novel combinations of parts and desirable particular constructions, will be apparent from the following description of the illustrative embodiment shown in the accompanying drawing, in which:

Figure 1 is a top plan view of an automobile chassis embodying my invention;

Figure 2 is a partial side elevation showing my novel hydraulic device, in longitudinal section, connected to the brake pedal; and Figure 3 is a view like Figure 2 but showing a modification.

The chassis illustrated in Figure 1 includes a frame 10, supported by the usual vehicle springs on road wheels 12 having brakes 14. The brakes are operated by any suitable connections 16 from a brake pedal or other driver-operated control member 18.

The vehicle is driven by an engine (not shown) through a transmission or the like 20 connected by means such as a propeller shaft 22 to wheel-driving mechanism in an axle 24.

According to the present invention, depression of the pedal 18 or its equivalent is variably resisted by means shown in two forms in Figures 2 and 3, thereby varying the effective pressure at the brakes for the same force exerted by the driver.

In the arrangement shown in Figure 2, a gear pump or the like 26 driven by the transmission 20 circulates oil or other fluid through a conduit 28 into a reservoir 30. The reservoir 30 communicates with a cylinder 32, shown as having therein a piston 34 connected by a link 36 or other means to the pedal 18, so that pressure on the bottom of the piston pushes back up against the pedal and resists the depression of the pedal.

The reservoir is shown with a filler plug 38, and may have one or more vents 40 on its low pressure side. The reservoir is divided by a partition 42 into a high-pressure side containing the cylinder 32 and a low-pressure side with a connecting passage 46.

In Figure 3 there are two partitions 42 and 44 defining a passage 48 communicating with the high-pressure side through a port 50 and with the low pressure side through a port 52.

A spring 54 may be arranged between the piston 34 and a ledge at the lower end of cylinder 32, to urge the piston 34 (and the pedal 18) upwardly. If desired, the usual return spring on the pedal may be omitted, and spring 54 be made strong enough to serve as a return spring for the pedal. Spring 54 is compressed whenever the brakes are applied by depressing the pedal.

The low pressure side of the reservoir in Figure 2 or the passage 48 in Figure 3, is connected by a conduit 56 or the like to the intake of the pump 26.

In Figure 2, the passage 46 is throttled more or less by a slide valve 58 connected to a vertical arm 60 carrying an inertia device such as a weight 62. In Figure 3, the weight 62 is mounted on the lower end of a vertical lever 64 pivoted between its ends and carrying at its upper end a yieldingly held poppet valve 66 controlling the passage 50.

It will be seen that normally fluid circulates freely from pump 26 through the reservoir, passage 46 or port 50 being wide open and offering substantially no resistance. When the brakes are applied, however, weight 62 swings forward and partially closes off or throttles the passage 46 or the port 50, whereupon the pump 26 (driven proportionately to the vehicle's speed) builds up a pressure in the cylinder 32 which reacts on the driver's foot.

Ordinarily this merely means that at high speeds the driver has to push harder than at low speeds to secure a given effective brake-applying pressure, and that as deceleration increases he must increase the pedal pressure to maintain the same brake applying pressure. However, if the deceleration becomes excessive, the weight 62 swings forward full force to close the passage 46 or port 50 entirely, almost instantly building up a back pressure against the pedal 18 which causes a partial release of the brakes.

There is a further advantage that the resistance to brake application is very low when they are first applied, giving a low initial pedal pressure, which pedal pressure goes up as the brakes take hold, the increase being greater for high car speeds and for high decelerations.

While two illustrative embodiments have been described in detail, it is not my intention to limit the scope of the invention to those particular embodiments, or otherwise than by the terms of the appended claims.

I claim:

1. A vehicle having a braking system including a control member, speed-controlled means resisting the operation of said member, and means for varying the resistance of the speed-controlled means in accordance with the deceleration of the vehicle by said means.

2. A vehicle having driving mechanism and a braking system including a control member, means operated by said mechanism and resisting the operation of said member, and inertia means for varying the resistance set up by said first means.

3. A vehicle having driving mechanism and a braking system including a control member, hydraulic means driven by said mechanism and resisting the operation of said member, and an inertia device automatically varying the effect of said hydraulic means.

4. A vehicle having driving mechanism and a braking system including a control member, hydraulic means, including a circulating system driven by said mechanism and means operated by the pressure in the circulating system and resisting the operation of said member, and an inertia device automatically varying the effect of said hydraulic means by variably throttling the circulation in the circulating system.

5. A vehicle having driving mechanism and a braking system including a control member, a pump driven by said mechanism, a hydraulic device receiving fluid under pressure from said pump and resisting the operation of the control member, and inertia means for varying the pressure of the fluid delivered by said pump to said device.

6. A vehicle having driving mechanism and a braking system including a control member, a pump driven by said mechanism, and a hydraulic device receiving fluid under pressure from said pump and resisting the operation of the control member.

7. A vehicle having a braking system including a control member, a pump, a hydraulic device receiving fluid under pressure from said pump and resisting the operation of the control member, and inertia means for varying the pressure of the fluid delivered by said pump to said device.

8. A vehicle having a braking system including a control member, a pump, and a hydraulic device receiving fluid under pressure from said pump and resisting the operation of the control member.

9. An auxiliary device for a braking system or the like comprising a transmission-driven pump, a cylinder having arranged therein a piston, means for connecting the piston to a brake pedal to resist its operation, connections between the cylinder and the pump, and inertia-operated means for varying the pressure in said connections and in said cylinder.

10. An auxiliary device for a braking system or the like comprising a pump, a cylinder having arranged therein a piston, means for connecting the piston to a brake pedal to resist its operation, conduits connecting the cylinder and the pump, and an inertia-operated valve controlling the passage of fluid through said conduits.

11. A vehicle having brakes, a driver operated control member, means whereby said control member operates said brakes, and additional means for exerting increased resistance on said control member dependent upon increased vehicle speed.

12. A vehicle having brakes, a driver operated control member, means whereby said control member operates said brakes, and additional means for exerting increased resistance on said control member dependent upon deceleration.

DAVID L. GALLUP.